Sept. 27, 1960     J. D. McMICHAEL     2,954,091
CLEANER SILENCER ASSEMBLY
Filed June 18, 1956     2 Sheets-Sheet 1
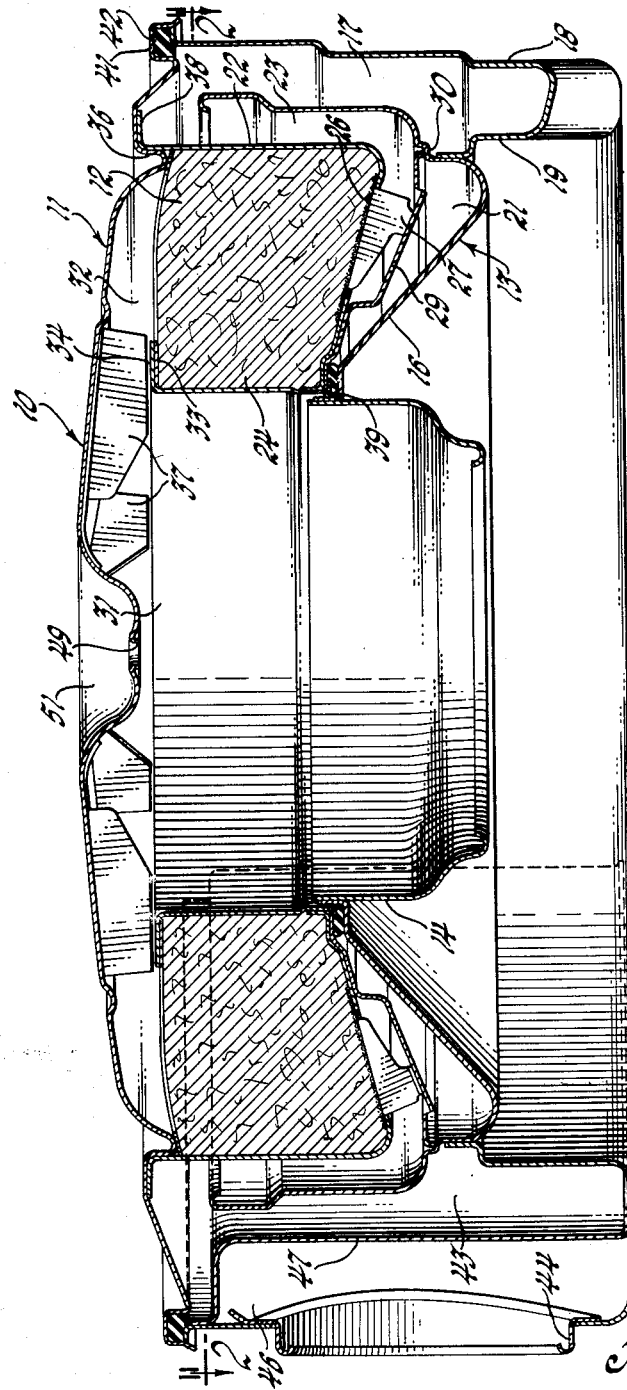
INVENTOR.
John Dale McMichael
BY
L. D. Burek
ATTORNEY Sept. 27, 1960  J. D. McMICHAEL  2,954,091
CLEANER SILENCER ASSEMBLY
Filed June 18, 1956  2 Sheets-Sheet 2
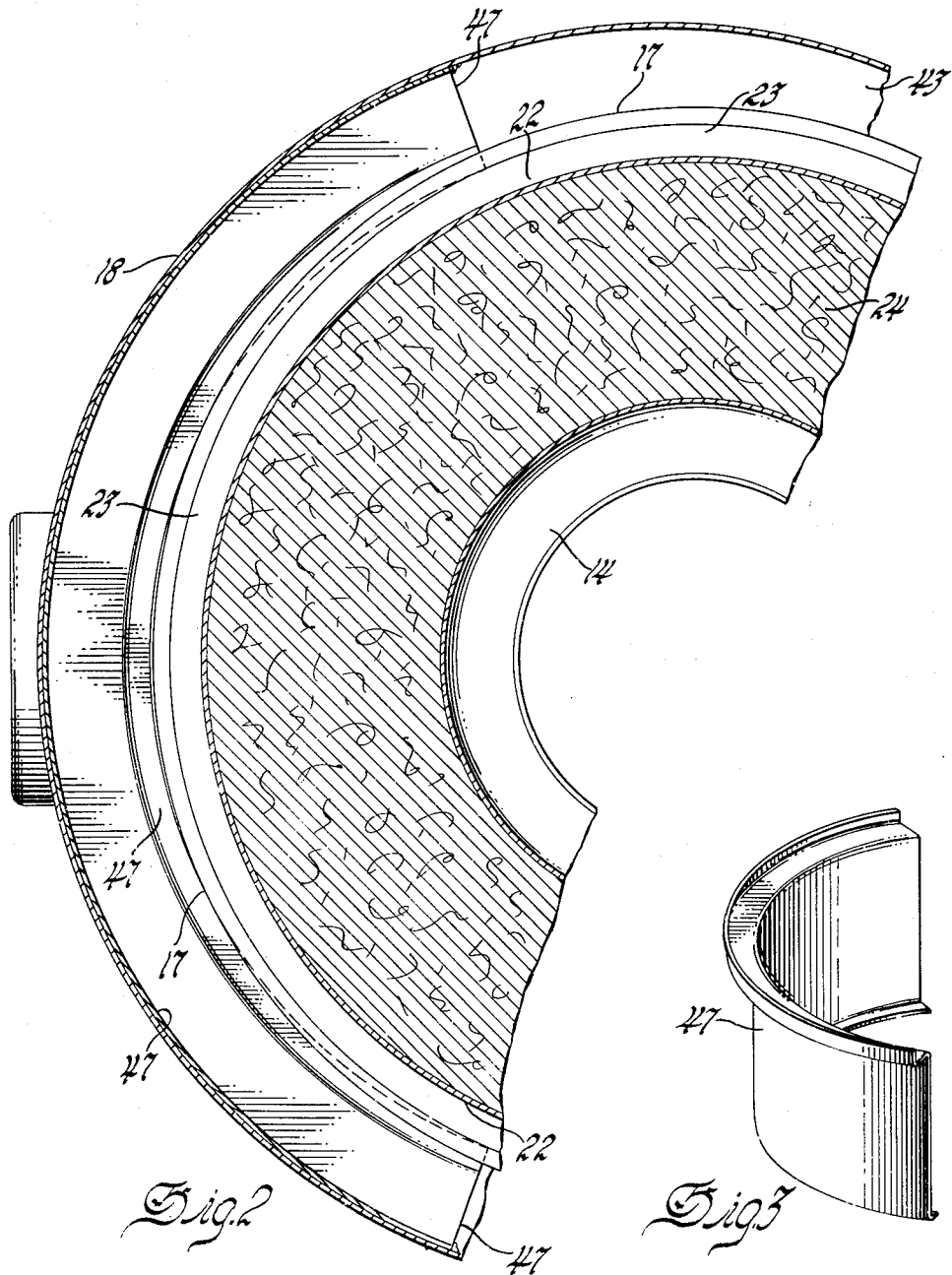
INVENTOR.
John Dale McMichael
BY
L. D. Busch
ATTORNEY United States Patent Office 2,954,091
Patented Sept. 27, 1960

2,954,091

CLEANER SILENCER ASSEMBLY

John D. McMichael, Swartz Creek, Mich., assignor to General Motors Corporation, Detroit, Mich., a corporation of Delaware Filed June 18, 1956, Ser. No. 591,925

1 Claim. (Cl. 181—33)

This invention relates to cleaner silencer assemblies for use with internal combustion engines for automotive and other purposes and has particular relation to a cleaner silencer assembly in which the cleaner structure has a low pass filter built into the inlet leading thereto.

It is proposed to construct such a cleaner silencer assembly of relatively large diameter, of minimum height, of a minimum number of parts and to provide a combination structure for cleaning air supplied to and attenuating sound emanating from the induction system of an engine. The entire structure is designed to absorb, reflect and filter the sound so that a maximum of sound absorbing and air cleaning efficiency may be obtained in a structure of minimum size.

In the drawing:

Figure 1 is a cross sectional view of a cleaner silencer assembly adapted for an attachment to the induction system of an internal combustion engine, and embracing the principals of the invention;

Figure 2 is a fragmentary horizontal view of the structure as shown substantially in the plane of line 2—2 of Figure 1;

Figure 3 is a perspective view of an inlet passage wall embodied in the structure shown by Figures 1 and 2.

The cleaner silencer assembly structure 10 embodying the invention comprises essentially a removable cover 11, a removable filter unit 12 and a cleaner silencer inlet and supporting unit 13. The unit 13 includes an outlet 14 secured in a flanged opening formed at the central part of the lower wall 16 of a cleaner casing 17. Also forming a part of the unit 13 is an outer silencer casing 18 having an inner wall 19 secured to an outer peripheral part of the lower wall 16 of the casing 17. The lower wall 16 forms an annular depression 21 providing an oil sump for the cleaner unit 12. Disposed within the cleaner casing 17 is a filter casing 22 having an outer wall spaced from the outer wall of the cleaner casing 17 to provide an annular inlet 23 leading downwardly beneath the lower part of the casing 22. The lower wall of the casing 22 is provided with a plurality of radially disposed openings therein for supplying air from the inlet 23 to the lower part of the filter chamber formed within the casing 22. An air filter 24 is disposed interiorly of the casing 22. A screen 26 may be employed over the openings in the lower wall of the casing 22 to prevent the material of the filter 24 from falling through the openings. The openings are formed in the lower wall of the casing 22 by cutting out and laterally bending, webs 27 that are adapted to provide radially disposed spacers beneath the casing 22. The lower ends of the webs 27 are adapted to engage an oil control baffle 29 secured rigidly to the inner part of the lower wall of the casing 22. The outer edge of the baffle 29 rests upon an annular ledge 30 formed in the outer edge of the lower wall 16 of the casing 17. The inner wall of the casing 22 and the outlet 14 form an outlet pasage 31 leading from an outlet chamber 32 formed within the cover 11 and above the filter 24. The filter 24 is held in place within the casing 22 by a radially perforated plate 33 secured in place at the inner periphery thereof by an outwardly extending flange 34 formed on the upper extremity of the inner wall of the casing 22. The filter unit 12 is secured in position within the casing 17 by an annular flange 36 and a plurality of radially disposed webs 37 extending inwardly of the cover 11. The webs 37 are depressed against the flange 34 and the flange 36 against the outer peripheral edge of the plate 33 when the cover 11 is disposed in assembled relation to the casing 22. Outwardly of the flange 36 the casing 22 is provided with a flange 38 for supporting the cover 11 upon the casing 22. A gasket 39 resiliently supports the inner part of the filter unit 12 upon an oppositely disposed shoulder formed around the inner part of the lower wall 16 of the casing 17 adjacent the outlet 14. The cover 11 beyond the flange 38 is provided with a channel 41 adapted to receive a gasket 42 against which the cover 11 may be secured against the flanged upper edge of the outer wall of the casing 18. The outer wall of the casing 18 is spaced from the casing 17 to provide an air distribution and an acoustical expansion chamber indicated at 43. The air inlet leading to the chamber 43 is formed by an opening 44 in the outer wall of the casing 18 which forms a part of an inlet passage 46 formed by a wall or a baffle indicated at 47. The baffle 47 has flanged edges secured to the outer and lower walls of the casing 18 and extends around the interior of the casing 18 in spaced relation to the outer wall of the casing. The opening 44 communicates with approximately the middle of the inlet passage 46 which terminates at the opposite ends of the wall 47 in the air distribution and acoustical expansion chamber 43. The passage 46 and the opening 44 form an air inlet passage leading to the chamber 43 and an acoustical impedance outlet passage leading from the chamber 43 to the atmosphere.

The air entering the chamber 43 is distributed around the casing 17 and is supplied to the filter 24 through the annular inlet passage 23 and the openings in the lower wall of the casing 22. From the filter the air flows to the induction system of an internal combustion engine or other device, through the openings formed in the plate 33, the outlet chamber 32 and the outlet passage 31. In passing over the baffle 29 the air flowing through the inlet 23 picks up oil from the sump 21 which is separated from the air by the filter element 24 and returned to the sump by gravity. The sound emanating from the induction system travels through the outlet passage 31, the outlet chamber 32 and is absorbed to a considerable extent in the filter 24. The inlet passage 23 forms an acoustical outlet for the sound not absorbed by the filter 24 and from which the sound emanates to the expansion chamber 43. In the expansion chamber the sound waves are reflected by the walls of the chamber and the high frequency sounds are largely attenuated by interference or cancelling. The oppositely directed ends of the inlet passage 46 form acoustical impedance passages that largely exclude any but low frequency sounds.

The structure may be assembled and disassembled by a wing nut and bolt structure adapted to secure cover 11 to the induction system of an engine. The bolt may project through the opening 49 in the cover 11 and the wing nut may be tightened against the cover in the depression 51. The tightening of the wing nut will depress the cover 11 until the webs 37 engage the flange 34. This also will cause the flange 36 to depress the outer peripheral part of the plate 33 against the filter 24 and the parts of the cover outwardly of the flange 36 against the flange 38 of the casing 22 and the flanged upper edge of the casing 18. The gaskets 41 and 39 will be compressed sufficiently to allow the parts to assume a proper assembled relation. The depression of the cover 11 also will tend to deflect the baffle 29 to tighten the outer peripheral edge thereof against the shoulder 31. When it is desired to disassemble the structure the wing nut may be loosened and the cover 11 removed. Thereafter it is possible to remove the filter unit 12 from the supporting unit 13, to clean the filter unit and to remove foreign matter from the interior of the casings 17 and 18. It will be noted that the casings 17, 18 and 23 are all open at the same ends so that the interiors of all casings are accessible merely by removing the cover 11.

The structure also may be assembled and disassembled by welding the cover 11 to the flange 38. Under such circumstances, when the cover 11 is removed the casing 22 also will be removed and the cover and filter unit may be cleaned as a single assembly.

I claim:

In a cleaner silencer structure comprising a cleaner casing having an annular air inlet and acoustical outlet adapted to communicate with the induction system of an internal combustion engine, a silencer casing disposed eccentrically around said cleaner casing and enclosing said inlet and outlet and providing air distribution and acoustical expansion chamber means around and communicating with said inlet and outlet, an elongated baffle wall disposed midway between the ends thereof within the widest part of said air distribution and acoustical expansion chamber means and providing elongated air inlet and impedance passage means communicating at the ends of said baffle wall with said air distribution and acoustical expansion chamber means, an opening formed in said silencer casing adjacent the middle of said air inlet and impedance passage means and providing communication through said air inlet and impedance passage means and between the atmosphere and said air distribution and acoustical expansion chamber means, said air inlet and impedance passage means and said air distribution and acoustical expansion chamber means being tuned to attenuate sounds emanating from said induction system of said engine.

References Cited in the file of this patent

UNITED STATES PATENTS

| | | |
|---|---|---|
| 2,310,510 | Brown | Feb. 9, 1943 |
| 2,681,123 | Sebok | June 15, 1954 |
| 2,764,142 | McMullen | Sept. 25, 1956 |
| 2,788,086 | Sebok | Apr. 9, 1957 |
| 2,789,662 | McMullen | Apr. 23, 1957 |
| 2,822,885 | Sebok et al. | Feb. 11, 1958 |

FOREIGN PATENTS

| | | |
|---|---|---|
| 1,017,065 | France | Sept. 10, 1952 |
| 1,109,454 | France | Sept. 28, 1955 |
| 937,131 | Germany | Dec. 29, 1955 |